Patented Oct. 9, 1945

2,386,626

UNITED STATES PATENT OFFICE 2,386,626

DRAWING SURFACE

Gale F. Nadeau, Edwin H. Hilborn, and Clarence S. Hunter, Rochester, N. Y., assignors to Eastman Kodak Company, Rochester, N. Y., a corporation of New Jersey No Drawing. Application January 30, 1943, Serial No. 474,226

3 Claims. (Cl. 117—8)

This invention relates to matte surfaced cellulose ester sheeting and more particularly to a process for forming a matte surface on which both ink and pencil designs can be drawn without tendencies toward smudging.

Heretofore, cellulose ester matte surfaced sheeting has been employed for ink and pencil drawings. One method of forming the surface has been to mechanically emboss an ester sheet to produce a "tooth" and to produce a general diffusion of light.

Recently it has been found in making mosaic maps from aerial negatives that the embossed surface was not hard enough and had too great opacity for this type of work. The desired surface should be able to take ink and very hard pencil drawings without smudging when one or more drawings are superimposed for a composite photograph, or for some other reason, and the opacity should be low enough to permit taking such a composite photograph of the details of the individual drawings.

An object, therefore, of the present invention is an improved cellulose ester matte surfaced sheeting which will take drawing ink and hard pencil designs without smudging.

Another object of the invention is a process of forming a matte surfaced transparent sheet on which ink and very hard pencil drawings can be made without smudging.

Another object of the invention is a chemical process for forming this type surface having a low opacity to light so that a composite photograph of several superimposed sheets of drawings can be made.

In accordance with the invention these and other objects are attained by forming a substantially uniform "toothed" surface coating on a thin supporting sheet and then treating this "toothed" or rough surface to increase the depth of the depressions or pores between the "tooths." This is accomplished by uniformly incorporating in the coating solution a finely divided insoluble crystalline-like material which tends to protrude from the surface of the dried coating and also incorporating a finely divided substance which will readily dissolve from the coating. On treating the applied coating in a solvent of the dissolvable substance, particles of this substance are removed from the surface of the coating adjacent to the protruding tooth-like crystalline particles and this increases the depth of the depressions or pores between the multiplicity of protruding crystalline particles. The coating preferably contains a binder material as well as a stabilizer for the crystalline material. Various solvents may be employed, depending on the nature of the binding material and/or the base sheet being coated.

The invention will be more clearly understood by reference to the following examples and more specific description.

Example 1

The following composition has been found to be very satisfactory for forming our improved drawing surface on a cellulose acetate base sheet.

|  | Per cent |
|---|---|
| Ground glass | 3.54 |
| Cellulose acetate | 5.80 |
| Gelatin | 0.26 |
| Acetic acid | 2.00 |
| Sodium sulfate | 0.60 |
| Water | 0.80 |
| Methyl Cellosolve | 14.00 |
| Acetone | 69.50 |
| Methanol | 3.50 |

In this formula the need of a non-soluble crystalline material for producing a "toothed" surface is provided for by the presence of the ground glass. The binder of the coating is the cellulose acetate and gelatin. The gelatin has a dual role in that it aids in dispersing the ground glass through the solvent medium and holds the glass in suspension during coating as well as making the drawing surface more hydrophilic, which property aids when drawings inks are placed on it.

The coating may be applied in any suitable manner, for example, by the well known bead coating method such as shown in Wells Patent 2,036,377.

The presence of sodium sulfate in the coating composition provides a unique and novel feature. In spite of the high abrasiveness of the ground glass, it was found that in a sheet depending essentially on the "tooth" formed by the glass particles that appreciable smudging of a pencil line was realized. We found that a better matte surface in this respect could be obtained by incorporating a water soluble component in the sheet and then dissolving it out of the sheet, particularly on its surface. While we do not wish to be limited to our explanation of the improvement obtained by this dissolving step, it appears that the removal of the water soluble component, for example, by passing the coated sheet through a water bath, provides innumerable small surface depressions or pores in the sheet and that the carbon from the pencil is embedded in these pores. If that be the case, then it is obvious that rubbing across such a surface would not remove the carbon as would be the case if it were on the surface of the film.

Therefore, after a solution of the above described composition has been applied and dried onto the base sheet, it is passed through a water bath to remove the sodium sulfate and residual solvent and incidentally to reduce the shrinkage of the product. The finished product has a uniform coating of a matte material which will take ink without being sufficiently abrasive to destroy the pen point but at the same time is hard enough to take an 8H drawing pencil satisfactorily. Another desirable property of this drawing surface is that the erasure of a line will not polish the matte surface sufficiently to reduce materially its ability to take another line. This quality is largely determined by the presence of the ground glass in the coating formula.

While we have found that sodium sulfate is satisfactory as the water soluble component of the coating, other soluble salts may be used such as:

$MgCl_2.6H_2O$, $MgSO_4.7H_2O$, $Mg(NO_3)_2.6H_2O$,
$Ca(NO_3)_2.4H_2O$, $CaCl_2.6H_2O$, $AlCl_3.6H_2O$,
$Al(NO_3)_3.9H_2O$, $Al(SO_4)_3.18H_2O$,
$Cd(NO_3)_2.4H_2O$, $CdCl_2.2H_2O$, $NaCl$, $KCl$, as well as other neutral water or alcohol soluble salts.

The base sheet employed may be of transparent cellulose acetate, but supporting sheets made from higher esters such as cellulose propionate and cellulose butyrate, or mixed acid esters such as cellulose acetate propionate, cellulose acetate butyrate, cellulose propionate butyrate or other such commonly known cellulose esters, as well as Cellophane or cellulose nitrate sheets could be used.

Also in place of the cellulose acetate in the coating formula, it is possible to substitute the above organic esters and mixed esters but in general completely satisfactory results can be obtained by employing cellulose acetate.

Various solvent combinations may be employed, as will be understood by those familiar with the art, so long as they will form a suitable solution with the organic materials of the formula which are soluble in the solvents.

The insoluble crystalline material may be glass, quartz, or the filter aid available in the market under the name "Hy-Flo." Glass particles tend to be oval in shape and we have found that particles of a diameter of about five microns is desirable. However, particles of glass, or other of the above-named materials, may be employed of a size from 0.1 to 25 microns. We have noted that if the particles are as small as this a stable dispersion of them can be made in the subbing solution.

The sodium sulfate particles are preferably about 25 microns or slightly larger.

While the formula given above is desirable, we have found that the solvent combination is not critical as long as the water content approximates four times the weight of the gelatin. As the formula is varied, the final roughness of the coated sheeting will vary, and it is possible to get acceptable results using both relatively low and high values for the dispersed phase. For example, we may employ a formula containing 100 parts of cellulose acetate, 60 parts of glass, 10 parts of sodium sulfate, and 4.5 parts of gelatin. The gelatin can be varied considerably, but should not be higher than an amount of gelatin equal to about one-half the weight of cellulose acetate. The amount of glass can vary from an amount equal to the acetate down to a very low concentration, approximately 5% of the weight of the ester. Variations in the concentration of sodium sulfate, or other soluble salt-like material, are more critical, since these salts have a definite precipitating action on the gelatin. It is preferable, therefore, to keep the concentration of salt low, for example, from 25% to 5% of the weight of the cellulose ester in the formula. These values may vary somewhat with the actual salt employed, since the extent to which the gelatin precipitates varies with the valences of the cation and anion present in the solution.

The transparency of the completed product is quite high. It is possible, for example, to superimpose five sheets and still be able to read the drawing on the bottom sheet. This permits the draftsman to draw various features to scale on separate sheets and then by superimposing and photographing them a composite drawing is produced. For example, in connection with copying details from aerial photographs, railroads may be traced on one sheet, highways on another, waterways on a third and so on using differently colored inks and then the whole be superimposed for inspection or photographic printing.

We claim:

1. The method of forming an improved drawing surface which comprises coating a transparent cellulose acetate sheet with a solution having the following formula:

| | Per cent |
|---|---|
| Grounded glass | 3.54 |
| Cellulose acetate | 5.80 |
| Gelatin | 0.26 |
| Sodium sulfate | 0.60 |
| Water | 0.80 |
| Methyl Cellosolve | 14.00 |
| Acetone | 69.50 |
| Methanol | 3.50 |
| Acetic acid | 2.00 | drying out the liquid components of the formula, removing substantial quantities of the sodium sulfate with water, and then again drying the coating.

2. The method of forming an improved drawing sheet suitable for pen and pencil drawings which comprises coating a transparent colloidized cellulosic base with a solution containing as the main constituents small ground particles of insoluble crystalline material, gelatin, a soluble salt, and a cellulose ester, drying out the liquid components of the solution thereby causing the crystalline particles to protrude from the coating extracting a substantial amount of the soluble salt from the coating thereby forming relatively deep craters in the drawing surface between the protruding particles of ground crystalline material and again drying the coating.

3. The method of forming an improved drawing sheet suitable for pen and pencil drawings which comprises coating a transparent cellulose ester support with a solution containing as the main constituents ground glass-like material, gelatin, sodium sulfate and cellulose acetate, drying out the liquid components of the solution thereby causing the crystalline particles to protrude from the coating extracting with water a substantial amount of the sodium sulfate from the coating thereby forming relatively deep craters in the drawing surface between the protruding particles of ground glass-like material and again drying the coating.

GALE F. NADEAU.
EDWIN H. HILBORN.
CLARENCE S. HUNTER.